3,074,803
MOLDING STARCH COMPOSITION
John F. McGowan, Jr., Plainfield, and Nicholas G. Marotta, Milltown, N.J., assignors to National Starch and Chemical Corporation, New York, N.Y., a corporation of Delaware
No Drawing. Filed Sept. 27, 1960, Ser. No. 58,640
2 Claims. (Cl. 106—38.5)

This invention relates to the preparation of molding starch compositions and to the starches thus prepared.

It is the prime object of the present invention to provide improved molding starch compositions which are particularly outstanding in regard to their relative freedom from undesirable oil build up. Additional objects include the preparation of structurally stable molding starches which remain free flowing and readily adaptable to use under a wide variety of moisture conditions and which, furthermore, exhibit a minimum degree of starch dusting along with improved moisture transmission properties.

As is well known in the art, molding starches are employed in the manufacture of confections as a molding medium in which to cast such materials as jelly gums, cream centers, marshmallows and caramels. In practice, the molding starch is placed into large trays and the desired impressions are then imprinted by the use of a mold or die. The confectionary material is deposited in the resulting molds and the trays are thereupon moved to drying rooms so as to allow the cast material to solidify or set. Upon the removal of the dry confection, the molding starch may receive additional castings or, as is more usually the case, the molding starch will then be recycled. In this recycling process the molding starch is reblended and then dried at a temperature of about 160° F. so as to remove any excess moisture which it had absorbed from the confectionary material.

Molding starches must be capable of retaining an accurate impression of the mold or die which will not crumble or collapse as a result of the stresses which are encountered both during and after the printing operation. It is, of course, necessary that they should be insoluble in the liquid confection and that they should not impart any undesirable flavors to the confection. Moreover, they must also be able to absorb moisture from the confection at a satisfactory rate and they should, finally, be readily removable from the finished confections. It is obvious from the above-mentioned requirement that the starch be insoluble in the liquid confection, as well as the requirement that the starch be readily removable from the confection, that the starch must be one which is ungelatinized and insoluble in cold water. A pregelatinized, cold water soluble starch would of course turn into a paste or solution upon contact with the liquid of the confection, and not only would not perform its function as a molding starch but would actually form a paste upon the confections.

The confectionary industry has heretofore prepared molding starches by adding small quantities of a pharmaceutical grade mineral oil to a powdered, food grade starch. The mineral oil lubricates and imparts to the starch the structural strength which is required for it to mold properly. It also serves to make the starch less dusty thereby minimizing the possibility of any explosions which may occur when starch dust is present.

Although satisfactory in many respects, the use of molding starches containing mineral oil does, however, present several problems to the practitioner. Particularly bothersome is the occurrence of what is commonly referred to as oil build-up. This phenomenon results from the build-up on the mineral oil containing molding starches of sugars, tailings, extraneous matter, and especially fats and oils all of which are derived from the various confections which come into contact with the molding starch. The presence of excessive amounts of such oils and other contaminants in a molding starch retards the necessary removal of moisture from the confections and also causes the starch to stick to the molds or dies resulting in imperfect impressions. In order to reduce the overall oil content and thus reactivate the molding starch it is necessary to add quantities of fresh starch to the molding starch mixture.

In an effort to eliminate the problem of oil build-up, attempts have been made to replace mineral oil with various high melting point, fatty substances such as fatty acid esters. However, these efforts have not been very successful. It appears that these fatty acid esters exist in the natural form of liquids, solids, or semi-solids which are rather difficult to blend with dry starch without the use of elaborate and expensive mixing devices. Generally unless such devices are employed, the attempted incorporation of these fatty substances will result in the formation of grits and lumps which are rather difficult to disperse. In those cases where these fatty substances are liquified by melting and then added to the dry starch, they again lump and congeal upon coming into contact with the starch. Thus, the necessary and desirable effects of these fatty substances are not obtained since they are, in effect, localized within the mass of starch.

Since these fatty acid esters are used in very low concentrations it is evident that they must be uniformly distributed so as to be able to lubricate and add adequate structural strength to the starch. The difficulties encountered in mixing these materials with starch would thus seem to preclude their use. In addition, it has been noted that these fatty esters do not function as effectively as does mineral oil in regard to reducing the dusting tendency of the starch.

We have now discovered a method for blending high melting point, fatty acid esters with starch so as to allow for the preparation of molding starch compositions which are relatively free of oil build-up and which exhibit a minimum degree of starch dusting.

In our process we employ a class of materials which function as solubilizers for the fatty acid esters and which also act to impart an anti-dusting property to the starch compounded therewith. By mixing one or more of these solubilizers with one or more fatty acid esters we obtain homogeneous liquids which are easily blended with dry starch so as to achieve uniform distribution of even very low concentrations of these fatty acid esters. By achieving this uniform distribution, the starch is fully lubricated and acquires adequate structural strength.

Optimum results are obtained in our process when we employ, as a solubilizer, glyceryl triacetate, the latter being a substance which is more commonly known as triacetin. Other equivalent materials which will function in our process are triethyl citrate, tributyl citrate, triethyl phosphate, propylene glycol, ethyl acetoacetate, glyceryl monoacetate, glyceryl diacetate and ethylene glycol diacetate. Hereinafter, when we refer to triacetin in this specification it will be referred to as a type of solubilizer material and it is to be understood that any of the above described materials are to be regarded as substitutes for triacetin.

In addition to making it possible to successfully blend fatty acid esters with starch, the use of a triacetin or a triacetin type solubilizer has resulted in producing molding starch compositions which are surprisingly free from oil build-up and which display very little in the way of starch dust. This long desired freedom from oil build-up is thought to result from the gradual breakdown of the triacetin which is brought about by its repeated exposure to the high temperatures encountered while being dried during the recycling process which, as explained earlier, serves to remove excess moisture from the molding starch composition. This gradual loss of the triacetin due to breakdown or volatilization, in effect, reduces the effects of the fatty material present in the molding starch and thus compensates for any extraneous oils which may be picked up from the confectionary material.

The reduced degree of starch dust in our molding starch compositions is also surprising since, as was noted earlier, fatty acid esters do not ordinarily alleviate this dangerous property of starch. The presence of the triacetin appears to contribute a synergistic dust reducing effect when combined with the fatty acid esters. Other notable properties of our molding starch compositions are their improved moisture transmission properties and also their ready adaptability for use under a wide variety of moisture conditions as is evidenced, for instance, by their ability to remain free flowing in a humid atmosphere.

In regard to the various high melting point, fatty acid esters which may be employed in our process, we prefer to make use of glyceryl monostearate. However, other applicable esters include such materials as propylene glycol stearate, glyceryl distearate, glyceryl tristearate, glyceryl mono-oleate, glyceryl trioleate, glyceryl oleostearate, and propylene glycol mono-laurate. It is also possible for the practitioner to use combinations of two or more of these fatty acid esters.

All types of starches may be used in the preparation of our molding starch compositions. These include starches derived from such sources as corn, high amylose corn, wheat, potatoes, waxy maize, tapioca, sorghum, sago or rice. Stach derivatives from any of the latter sources including esterified, etherified and thin boiling starches still retaining amylaceous material may also be employed.

As for proportions, the molding starch compositions of our invention may contain, on a percent by weight basis, from 94.0–99.9% starch, from 0.08–5.0% of triacetin or equivalent solubilizer and from 0.02–5.0% of glyceryl monostearate or equivalent fatty acid ester.

The actual preparation of our molding starch compositions is accomplished by combining the selected solubilizer and fatty acid ester, under agitation, until a homogeneous liquid is obtained. In those cases where solid or semi-solid fatty acid esters are used, gentle heating, in the order of from 75–160° F. is applied in order to facilitate their admixture with the solubilizer. In any event, the resulting liquid is then blended with the starch, either by being sprayed or by some other appropriate method. The final mixture is then agitated until it is entirely uniform in composition whereupon it is ready for use as a molding starch.

The following examples will more clearly illustrate the embodiment of our invention.

*Example 1*

This example presents a number of formulations which illustrate the preparation of our molding starch compositions.

In preparing these formulations the procedure employed comprised the admixture, under agitation, of the solubilizer and the fatty acid ester. These formulations all contained solid or semi-solid esters and were heated, under agitation, to a temperature in the range of from 135–145° F. so as to facilitate the melting of these esters. In all cases the resulting liquids, comprising a mixture of solubilizer and fatty acid ester were sprayed onto the starch with the entire mass then being thoroughly blended until uniform in composition.

1

| | Parts |
|---|---|
| Corn starch | 99.90 |
| Triacetin | 0.08 |
| Glyceryl monostearate | 0.02 |

2

| | Parts |
|---|---|
| Corn starch | 94.00 |
| Triacetin | 5.00 |
| Glyceryl monostearate | 1.00 |

3

| | |
|---|---|
| Corn starch | 94.00 |
| Triacetin | 1.00 |
| Glyceryl monostearate | 5.00 |

4

| | |
|---|---|
| Waxy maize starch | 97.00 |
| Triethyl citrate | 0.08 |
| Propylene glycol stearate | 2.92 |

5

| | |
|---|---|
| Tapioca starch | 96.50 |
| Tributyl citrate | 3.48 |
| Glyceryl distearate | 0.02 |

6

| | |
|---|---|
| Acetate ester of corn starch | 94.00 |
| Triethyl phosphate | 2.00 |
| Glyceryl tristearate | 2.00 |

7

| | |
|---|---|
| Hydroxyethyl ether of corn starch | 94.50 |
| Propylene glycol | 0.50 |
| Glyceryl mono-oleate | 5.00 |

8

| | |
|---|---|
| Corn starch | 94.60 |
| Ethyl acetoacetate | 5.00 |
| Glyceryl trioleate | 0.40 |

9

| | |
|---|---|
| Corn starch | 95.00 |
| Glyceryl monoacetate | 2.00 |
| Ethylene glycol diacetate | 1.00 |
| Glyceryl oleo-stearate | 2.00 |

10

| | |
|---|---|
| Corn starch | 96.00 |
| Triacetin | 0.50 |
| Propylene glycol mono-laurate | 1.00 |
| Glyceryl monostearate | 2.50 |

All of the above described formulations were employed as molding starch compositions wherein they displayed a relative freedom from oil build-up as compared with molding starch compositions prepared with mineral oil. In addition, the molding starches of our invention displayed a minimum degree of dusting. It should be noted that in formulation #9 a combination of two carriers were used while in formulation #10 a combination of two fatty acid esters were used.

Summarizing, this invention provides the practitioner with novel molding starch compositions displaying improved resistance to oil build-up along with a minimum degree of dusting. Variations may be made in procedures, proportions and materials without departing from the scope of this invention which is limited only by the following claims.

We claim:
1. A molding starch composition for use in the manufacture of confections, said composition consisting essentially of an intimate mixture of an ungelatinized, cold water-insoluble starch, a fatty acid ester selected from the class consisting of propylene glycol stearate, glyceryl monostearate, glyceryl distearate, glyceryl tristearate, glyceryl mono-oleate, glyceryl trioleate, glyceryl oleostearate, and propylene glycol mono-laurate, and a solubilizer for said fatty acid ester selected from the class consisting of glyceryl triacetate, triethyl citrate, tributyl citrate, triethyl phosphate, propylene glycol, ethyl acetoacetate, glyceryl monoacetate, glyceryl diacetate and eth- ylene glycol diacetate, the proportions by weight of the mixture ingredients being starch from 94.0% to 99.9%, fatty acid ester from 0.02% to 5.0% and solubilizer from 0.08% to 5.0%.

2. The process of preparing an improved molding starch composition for use in the manufacture of confections comprising the steps of blending a fatty acid ester selected from the class consisting of propylene glycol stearate, glyceryl monostearate, glyceryl distearate, glyceryl tristearate, glyceryl mono-oleate, glyceryl trioleate, glyceryl oleo-stearate and propylene glycol mono-laurate, with a solubilizer for said fatty acid ester selected from the class consisting of glyceryl triacetate, triethyl citrate, tributyl citrate, triethyl phosphate, propylene glycol, ethyl acetoacetate, glyceryl monoacetate, glyceryl diacetate and ethylene glycol diacetate and intimately mixing the resulting liquid with an ungelatinized, cold water-insoluble starch, the proportions by weight of the ingredients being starch from 94.0% to 99.9%, fatty acid ester from 0.02% to 5.0% and solubilizer from 0.08% to 5.0%.

References Cited in the file of this patent

UNITED STATES PATENTS

| | | |
|---|---|---|
| 1,074,600 | Breyer | Oct. 7, 1913 |
| 2,513,638 | Glabe | July 4, 1950 |
| 2,793,130 | Shannon et al. | May 21, 1957 |

FOREIGN PATENTS

| | | |
|---|---|---|
| 431,275 | Great Britain | July 4, 1935 |